(12) United States Patent
Sase et al.

(10) Patent No.: US 7,864,414 B2
(45) Date of Patent: Jan. 4, 2011

(54) MICROSCOPE AND VIRTUAL SLIDE FORMING SYSTEM

(75) Inventors: Ichiro Sase, Yokohama (JP); Shuji Toyoda, Chigasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/409,869

(22) Filed: Mar. 24, 2009

(65) Prior Publication Data

US 2009/0185267 A1 Jul. 23, 2009

Related U.S. Application Data

(62) Division of application No. 11/524,479, filed on Sep. 21, 2006, now Pat. No. 7,518,790.

(30) Foreign Application Priority Data

Sep. 22, 2005 (JP) ............................. 2005-275399

(51) Int. Cl.
*G02B 21/00* (2006.01)

(52) U.S. Cl. ...................... 359/369; 359/368; 359/373

(58) Field of Classification Search ......... 359/368–390, 359/656–661, 813–824
See application file for complete search history.

(56) References Cited

U.S. PATENT DOCUMENTS

| | | | |
|---|---|---|---|
| 6,112,028 A * | 8/2000 | Okada .......................... | 396/55 |
| 6,172,804 B1 | 1/2001 | Schuck et al. | |
| 6,313,452 B1 * | 11/2001 | Paragano et al. ......... | 250/201.3 |
| 6,456,430 B1 | 9/2002 | Kasahara et al. | |
| 6,710,855 B2 | 3/2004 | Shiraishi | |
| 6,771,310 B1 | 8/2004 | Torita et al. | |
| 6,909,542 B2 * | 6/2005 | Sasaki ......................... | 359/385 |
| 2002/0105640 A1 * | 8/2002 | Deck et al. ................... | 356/301 |
| 2003/0035208 A1 | 2/2003 | Engelhardt | |
| 2003/0142399 A1 | 7/2003 | Schoeppe | |
| 2003/0210262 A1 | 11/2003 | Gahm et al. | |
| 2004/0246572 A1 | 12/2004 | Muller | |
| 2005/0007660 A1 | 1/2005 | Denk | |
| 2005/0030651 A1 | 2/2005 | Sekiyama | |
| 2005/0243412 A1 | 11/2005 | Bellouard et al. | |
| 2005/0248837 A1 * | 11/2005 | Sase et al. ................... | 359/380 |

FOREIGN PATENT DOCUMENTS

| | | |
|---|---|---|
| DE | 101 18 463 | 10/2002 |
| DE | 101 39 920 | 3/2003 |
| DE | 101 60 172 | 6/2003 |
| JP | 2002-31758 | 1/2002 |
| SU | 1126919 | 11/1984 |

* cited by examiner

*Primary Examiner*—Thong Nguyen
(74) *Attorney, Agent, or Firm*—Miles & Stockbridge P.C.

(57) ABSTRACT

Providing a microscope capable of movably adjusting an observation field of a sample without moving the sample. The microscope includes a first objective lens, a second objective lens, a mirror, an angular adjustment mechanism, and a shift mechanism. The first objective lens is disposed to the sample side. The second objective lens forms an intermediate image of the sample together with the first objective lens. The mirror is disposed with a tilt on an optical path between the first objective lens and the second objective lens. The angular adjustment mechanism rotatably adjust the mirror in the tilt direction. The shift mechanism makes a shift adjustment of the second objective lens in an axial direction of a rotation axis of the mirror. With the configuration, the observation field can be moved two-dimensionally by the angular adjustment mechanism.

6 Claims, 8 Drawing Sheets

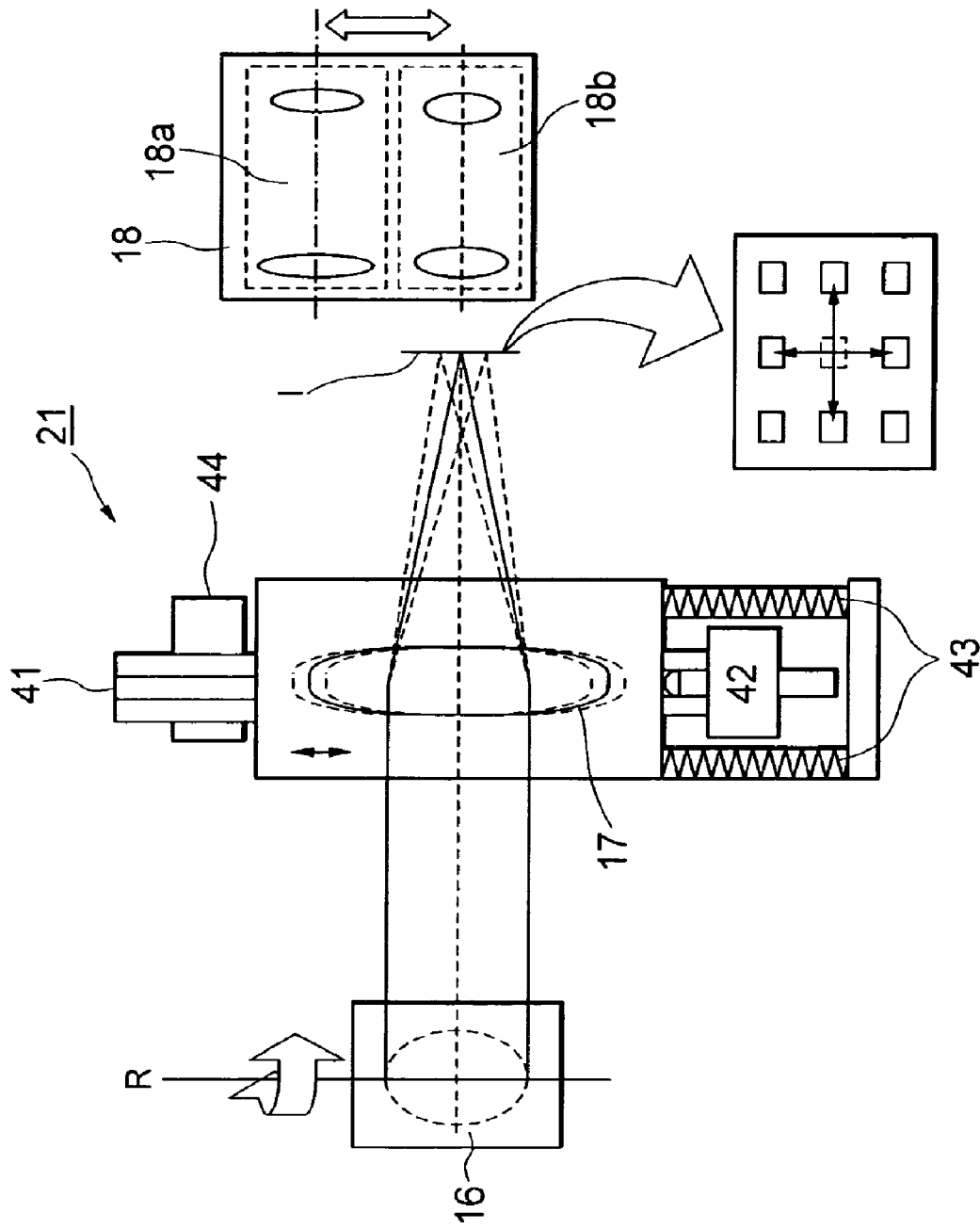

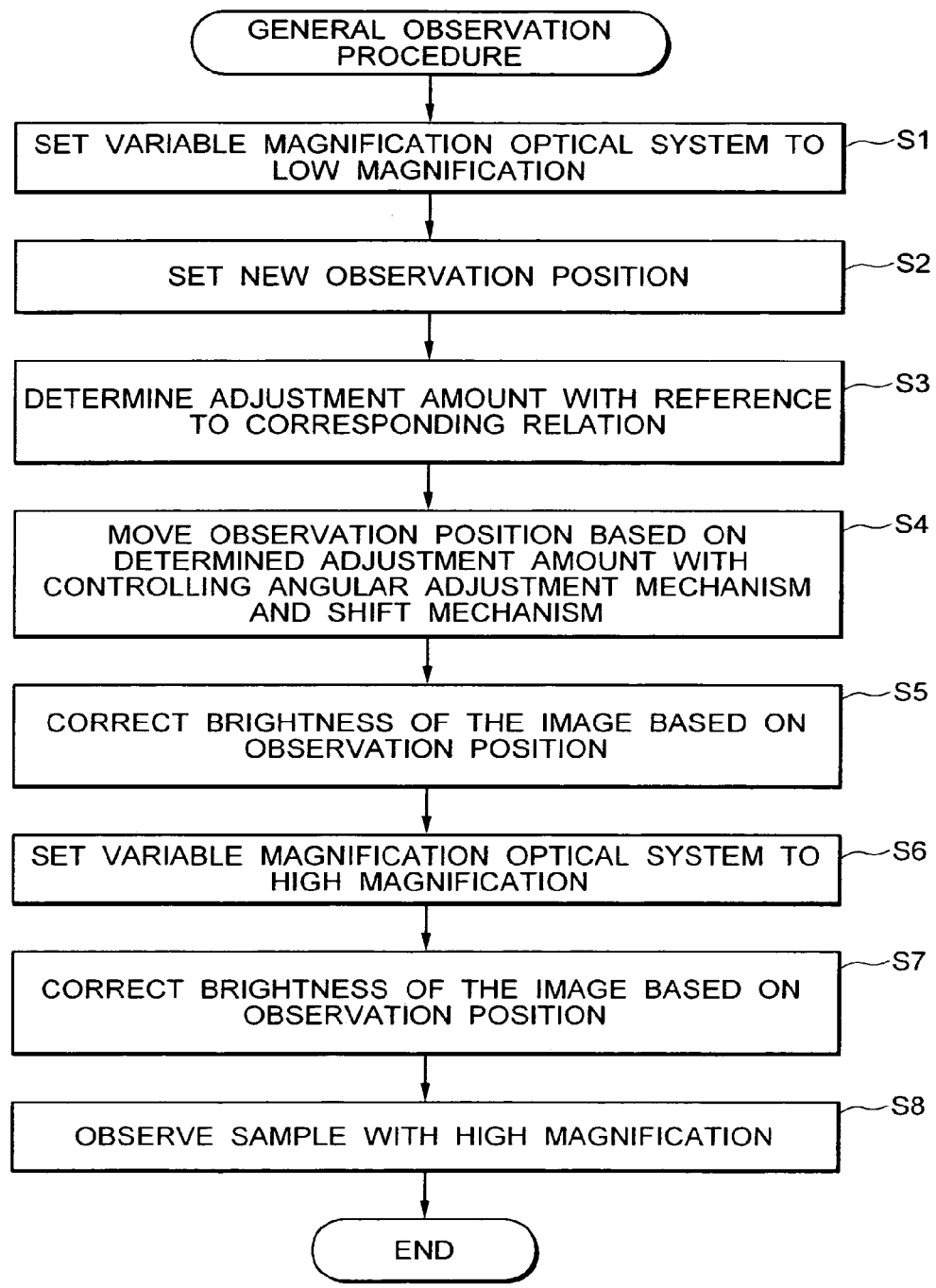

MICROSCOPE AND VIRTUAL SLIDE FORMING SYSTEM

CROSS-REFERENCE TO RELATED APPLICATION

This application is a division of application Ser. No. 11/524,479 filed Sep. 21, 2006 now U. S. Pat. No. 7,518,790. This application also claims priority from Japanese Patent Application No. 2005-275399 filed on Sep. 22, 2005 the content of which is hereby incorporated by reference into this application.

BACKGROUND OF THE INVENTION

1. Field of the Invention

The present invention relates to a microscope and a virtual slide forming system.

2. Related Background Art

In a conventional microscope observation, after searching for a point to be observed with an objective lens having low magnification, the position is brought to the center of the observation field. In this state, the objective lens having lower magnification is replaced by a one having higher magnification, and the point is observed in an enlarged manner.

A microscope disclosed in Japanese Patent Application Laid-Open No. 2002-31758 combines an objective lens with lower magnification is combined with a variable magnification optical system. With this construction, a position to be observed is selected by setting the variable magnification optical system at low magnification, and the position is moved to the center of the observation field. In this state, the variable magnification optical system is changed to high magnification, and the position is observed in an enlarged manner.

In a microscope observation, operations such as moving an observation field and enlarging an observation position are frequently repeated. In a conventional microscope, in order to move an observation field, it is necessary to carry out an operation such as moving a stage on which a sample is placed or moving an objective lens.

In a microscope observation in a field such as electrophysiology, it may frequently be happened that a manipulator or the like is set to a sample. In this case, since the distance between the tip of the objective lens and the manipulator is extremely small (1 mm or less), it has been very difficult to move the sample (stage) without contact with each other. Moreover, in order to secure environment of the sample, there are structures such as tubes or channels for exchanging solution around the sample, so that it is extremely difficult to move the sample (stage).

Moreover, when observing with an immersion-objective lens, it may happen that the interface between the objective lens and the water, being in the state of contact with each other, makes a change by moving the field of view. In this case, when the sample is vulnerable to the vibration, there is a possibility of danger that the state of contact between an electrode needle set on the tip of the manipulator and the sample or the sample itself is changed.

Accordingly, it has been demanded to provide a method to move the observation field of view without moving or changing the objective lens or without changing the position of the stage or the sample.

SUMMARY OF THE INVENTION

The present invention is made in view of the aforementioned problems and has an object to provide a microscope capable of moving an observation field without moving the sample.

There is another object of the present invention to provide a microscope capable of moving an observation field without tilting the direction of the observation image.

According to a first aspect of the present invention, there is provided a microscope including, a first objective lens disposed on an optical path between a sample and an observation image near to the sample, a second objective lens that forms an intermediate image conjugate with the sample together with the first objective lens, a mirror that is disposed with a tilt on the optical path between the first objective lens and the second objective lens and changes a direction of the optical path by reflection, an angular adjustment mechanism that rotatably adjusts the mirror in a tilting direction, and a shift mechanism that makes a shift adjustment of the second objective lens in a direction of a rotation axis of the mirror, wherein the observation field of the sample can be moved two-dimensionally by the angular adjustment mechanism and the shift mechanism.

In the first aspect of the present invention, it is preferable that the microscope further includes a memory that stores corresponding relation between "a position of the observation field" and "a rotation amount of the mirror and a shift amount of the second objective lens", an adjustment amount determiner that determines the rotation amount and the shift amount referring to the corresponding relation in accordance with the position of the observation field instructed to be input, and a controller that controls the angular adjustment mechanism and the shift mechanism in accordance with the rotation amount and the shift amount determined by the adjustment amount determiner.

In the first aspect of the present invention, it is preferable that the microscope further includes a variable magnification optical system that is disposed to the image side of the second objective lens and is capable of varying magnification of the observation image.

In the first aspect of the present invention, it is preferable that the microscope further includes a brightness correcting portion that corrects brightness of the observation image in response to the position of the observation field.

According to a second aspect of the present invention, there is provided a microscope including, a first objective lens disposed on an optical path between a sample and an observation image near to the sample, a second objective lens that forms an intermediate image conjugate with the sample together with the first objective lens, a mirror that is disposed with a tilt on the optical path between the first objective lens and the second objective lens and changes a direction of the optical path by reflection, and a two-dimensional shift mechanism that moves the second objective lens two-dimensionally in a plane perpendicular to the optical axis, wherein the observation field of the sample can be moved two-dimensionally by the two-dimensional shift mechanism.

According to a third aspect of the present invention, there is provided a microscope including, a first objective lens disposed on an optical path between a sample and an observation image near to the sample, a second objective lens that forms an intermediate image conjugate with the sample together with the first objective lens, a mirror that is disposed with a tilt on the optical path between the first objective lens and the second objective lens and changes a direction of the optical path by reflection, an angular adjustment mechanism that adjusts the direction to change an extending direction of the mirror, an imaging device that captures the observation image and forms image data, and a device rotation mechanism that rotates the imaging device in response to an inclination produced upon adjusting the direction of the mirror to fix the direction of the image data to be captured, wherein the observation field of the sample can be moved two-dimensionally by the angular adjustment mechanism.

According to a fourth aspect of the present invention, there is provided a microscope including, a first objective lens disposed on an optical path between a sample and an observation image near to the sample, a second objective lens that forms an intermediate image conjugate with the sample together with the first objective lens, a first mirror that is disposed with a tilt on the optical path between the first objective lens and the second objective lens and changes a direction of the optical path by reflection, a second mirror that is disposed with a tilt different from that of the first mirror on the optical path between the first objective lens and the second objective lens and changes a direction of the optical path by reflection, a first angular adjustment mechanism that rotatably adjusts the first mirror in the tilt direction thereof, and a second angular adjustment mechanism that rotatably adjusts the second mirror in the tilt direction thereof, wherein the observation field of the sample can be moved two-dimensionally by the first angular adjustment mechanism and the second angular adjustment mechanism.

According to a fifth aspect of the present invention, there is provided a virtual slide forming system including the microscope according to the present invention, an image data forming portion that successively produces image data by capturing the observation image with varying the observation field of the microscope, and an image synthesizing portion that forms a virtual slide of the sample by synthesizing a plurality of the produced image data.

According to the present invention, the observation field of the microscope can be moved two-dimensionally without varying positional relation between the objective lens (the first objective lens) close to the sample and the sample.

Moreover, according to the present invention, the inclination of the observation image upon moving the observation field can be reduced.

Other features and advantages according to the present invention will be readily understood from the detailed description of the preferred embodiments in conjunction with the accompanying drawings.

BRIEF DESCRIPTION OF THE DRAWINGS

FIG. 2 is a diagram showing a portion of an optical path of the microscope system 10.

FIGS. 3A, 3B, and 3C are diagrams explaining movement of the observation field by the mirror 16, in which FIG. 3A is a diagram showing a case the mirror 16 is rotated for adjusting in the tilt direction, FIG. 3B is a diagram showing a case the mirror 16 is rotated for adjusting around an axis of incident light, and FIG. 3C is a diagram seen along C-C line in FIG. 3B.

FIG. 4 is a flowchart showing a general observation procedure.

DESCRIPTION OF THE MOST PREFERRED EMBODIMENTS

Embodiments according to the present invention are explained below with reference to accompanying drawings.

First Embodiment

Figure 1:
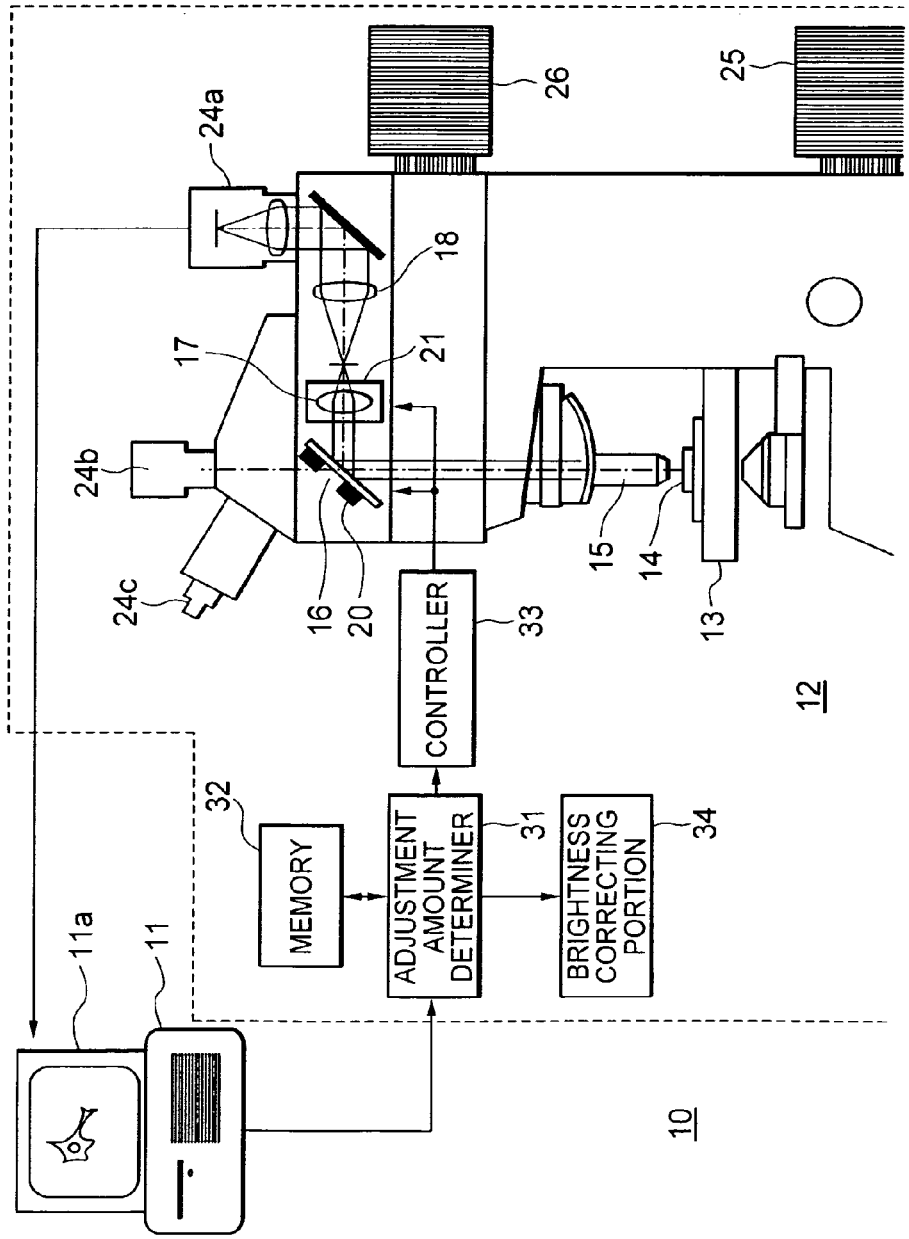
FIG. 1 is a diagram showing a microscope system 10 according to a first embodiment.

FIG. 1 is a diagram showing a microscope system 10 according to a first embodiment. FIG. 2 is a diagram showing a portion of an optical path of the microscope system 10. The microscope system 10 will be explained below with reference to FIGS. 1 and 2.

The microscope system 10 is roughly composed of a microscope 12 and a computer 11.

A sample 14 to be observed is placed on a stage 13 of the microscope 12. A first objective lens 15 is disposed facing the sample 14. To the image side of the first objective lens 15, there is disposed an optical path on which a mirror 16, a second objective lens 17, and a variable magnification optical system 18 are disposed.

The mirror 16 is disposed with a tilt on the optical path between the first objective lens 15 and the second objective lens 17. A rotation axis R is disposed to the mirror 16 to be rotatable in a tilt direction. An angular adjustment mechanism 20 rotatably adjusts the mirror 16 around the rotation axis R. The rotation axis R is not limited to an actual rotation axis. For example, the rotation axis R may be virtually realized by setting a guide rail with a tilt course formed on the periphery of the mirror 16.

On the other hand, a shift mechanism 21 is disposed for the second objective lens 17. The shift mechanism 21 adjusts the second objective lens 17 in a shift direction parallel to the rotation axis R.

For example, the shift mechanism 21 is composed of a guide rail 41 for guiding in the shift direction, a stepping motor 42 for driving and thrusting the second objective lens 17, springs 43 for biasing the second objective lens 17 to the stepping motor 42, and a position sensor 44.

Moreover, after the second objective lens 17, there is disposed the variable magnification optical system 18. The variable magnification optical system 18 is composed of a low magnification optical system 18a and a high magnification optical system 18b alternatively put on the optical path. Incidentally, the variable magnification optical system 18 may be composed of a zoom optical system.

An observation image of the sample 14 formed through the variable magnification optical system 18 is captured by an observation camera 24a. The captured image of the observation camera 24a is displayed on the observation monitor 11a after carrying out image processing by the computer 11. In the microscope 12, two systems of illumination mechanism are changeably disposed. One system is a transmission light source 25 providing transmission illumination light from lower side of the sample 14. The other system is a fluorescence excitation light source 26 illuminating the sample 14 with fluorescence excitation light from the first objective lens 15 side.

Moreover, in the microscope 12, there are provided an adjustment amount determiner 31, a memory 32, a controller 33, and a brightness correcting portion 34. The adjustment amount determiner 31 determines a rotation amount of the mirror 16 and a shift amount of the second objective lens 17 on the basis of "the position of the observation field" instructed to input by the computer 11. The corresponding relation for determining the adjusting amount is stored in the memory 32. The controller 33 controls and drives the angular adjustment mechanism 20 and the shift mechanism 21 on the basis of the determined adjusting amount. On the other hand, the brightness correcting portion 34 corrects variation in brightness in the observation field by controlling the transmission light source 25 or the fluorescence excitation light source 26 in accordance with "the position of the observation field" instructed to input by the computer 11.

The mirror 16 may be composed of a semi-transparent mirror. In this case, the mirror 16 transmits light with a given proportion. The transmitted light may be provided to an observation camera 24b or an eyepiece portion 24c.

A moving principle of the observation field according to the first embodiment is explained below.

Figure 3A:
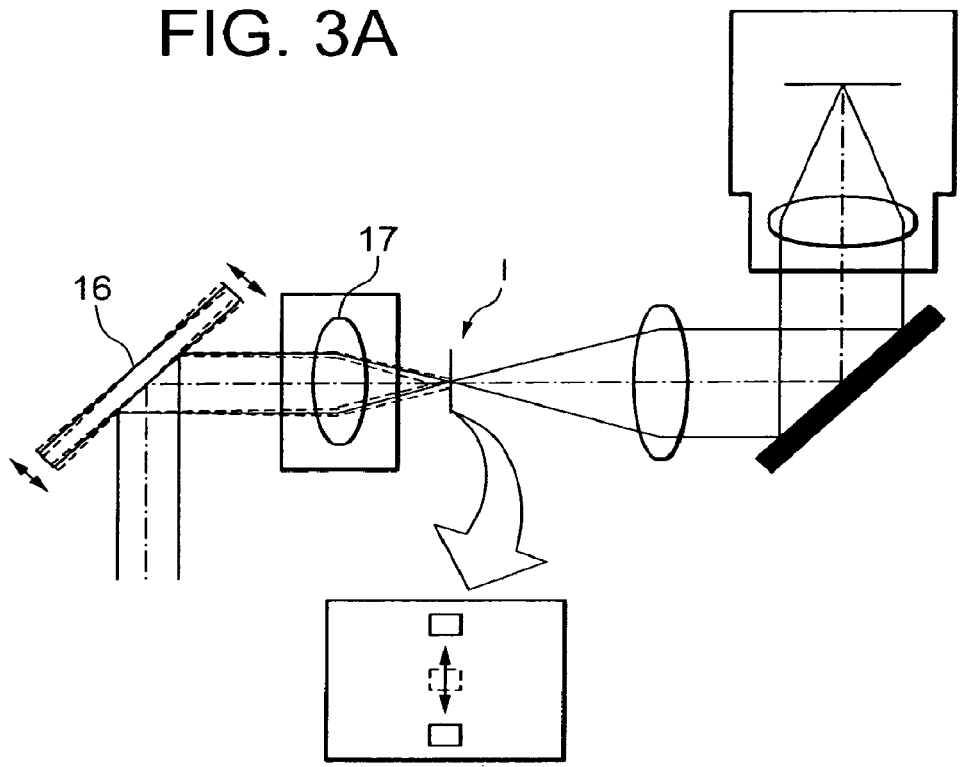
Figure 3C:
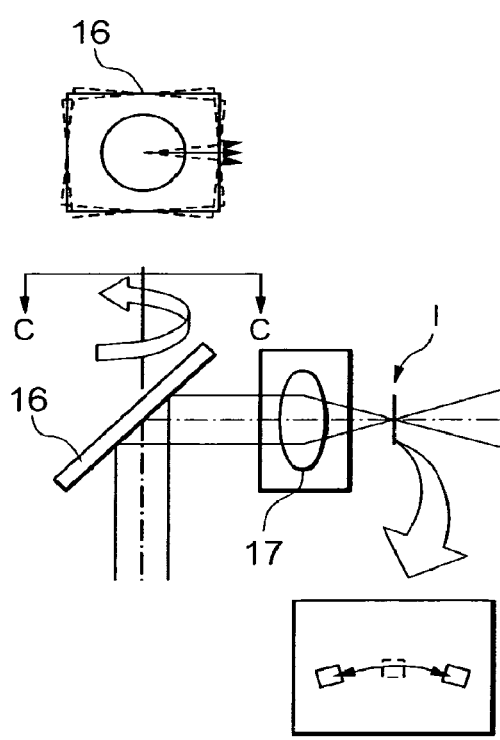
Figure 3B:
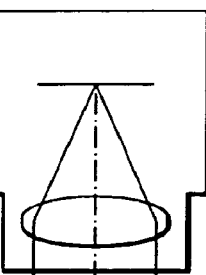

FIGS. 3A, 3B, and 3C are diagrams explaining movement of the observation field by the mirror 16.

FIG. 3A is a diagram showing a case the mirror 16 is rotatably adjusted in the tilt direction. With the adjustment rotating in the tilt direction, the reflected light flux from the mirror 16 is moved in the tilt direction. As a result, the rotated reflected light flux is incident to the second objective lens 17, and a position of an intermediate image I formed by the second objective lens 17 is moved. This movement does not cause inclination of the direction of the intermediate image I, so that the intermediate image I is moved linearly in the tilt direction On the other hand, FIGS. 3B and 3C are diagrams showing a case the mirror 16 is rotated for adjusting around an axis of incident light. FIG. 3C is a diagram seen along C-C line in FIG. 3B. In this rotation adjustment, as shown in FIGS. 3B and 3C, the tilt direction of the mirror 16 rotates in the section of the incident light flux. Accordingly, the section of the reflected light flux from the mirror 16 rotates. By the rotation of the light flux, the direction of the intermediate image I formed by the second objective lens is inclined. With this principle, when the mirror 16 is rotated around the axis of the incident light flux, the observation field is rotationally moved and the direction of the observation image is inclined.

Accordingly, in the first embodiment, the mirror 16 is rotated for adjustment only in the tilt direction. With the rotational adjustment only in the tilt direction, the observation image is not inclined as shown in FIG. 3A. However, the observation field cannot be moved in the direction of the rotation axis of the mirror 16, so that the observation field cannot be moved two-dimensionally.

Then, in the first embodiment, the second objective lens 17 is shifted in the axial direction of the rotation axis. With the shift movement, it becomes possible to linearly move the intermediate image I in the direction of the rotation axis.

As described above, in the first embodiment, in combination with the rotational adjustment of the mirror 16 in the tilt direction and the shift movement of the second objective lens 17 in the direction of the rotation axis, the observation field can be moved two-dimensionally without inclining the observation image.

FIG. 4 is a flowchart showing a general observation procedure. Control movement for the observation field is explained below in order from step number in FIG. 4.

In step S1, in order to move the observation field, a user sets the variable magnification optical system to low magnification. With the magnification setting, a wide field of the sample image is displayed on the observation monitor 11a.

In step S2, the user determines a desired observation position in the sample image with watching the screen of the observation monitor 11a. The user gives an instruction to move the observation field such that the sample position comes to the center of the image, to the computer 11 with operating a keyboard, a mouse, and the like. The computer 11 transmits the movement instruction to the adjustment amount determiner 31. The adjustment amount determiner 31 determines the position (coordinates) of the observation field to be moved on the basis of the movement instruction and the present position of the observation field.

In step S3, in the memory 32 of the microscope 12, corresponding relation between the position of the observation field and "the rotation amount of the mirror 16 and the shift amount of the second objective lens 17" is stored in advance.

Such a corresponding relation can be formed by, for example, the following procedure:

At first, a two-dimensional coordinate system is set on the stage 13. In this case, one coordinate element is set to a coordinate element A which is in the direction of a locus of the movement of the observation field by the rotational adjustment in the tilt direction of the mirror 16. The other coordinate element is set to a coordinate element B which is in the direction of a locus of the movement of the observation field by the shift adjustment of the second objective lens 17.

Then, the positional coordinates (A, B) shown at the center of the observation monitor 11a are successively obtained with changing "the rotation amount of the mirror 16 and the shift amount of the second objective lens 17" at a given step. By integrating the experiment results, the corresponding relation can be completed.

Incidentally, it may be possible to form corresponding relations independent in respective coordinates such as "a corresponding relation between a coordinate element A and a rotation amount of the mirror 16" and "a corresponding relation between a coordinate element B and a shift amount of the second objective lens 17".

The adjustment amount determiner 31 determines a corresponding adjustment amount such as a rotation amount of the mirror 16 and a shift amount of the second objective lens 17 by referring to the corresponding relation in the memory 32 for the observation position.

In step S4, The controller 33 controls the angular adjustment mechanism 20 and the shift mechanism 21 on the basis of the adjustment amount. As a result, the rotation adjustment of the mirror 16 and the shift adjustment of the second objective lens 17 are carried out, and a desired observation field comes to the center of the observation monitor 11a.

In step S5, the brightness of the observation image usually varies in response to the movement of the observation field. In the brightness correcting portion 34, corresponding relations between "an observation position" and "variation in an observation image" are stored in advance in every magnification of the variable magnification optical system 18. The brightness correcting portion 34 obtains brightness variation information of the observation image at low magnification by referring to the corresponding relation for the position of the observation field transmitted from the adjustment amount determiner 31. The brightness correcting portion 34 corrects the brightness of the observation image, and holds the brightness of the observation monitor 11a constant. Such a brightness correction can be carried out by various ways such as a brightness control of the illumination light source (the transmission light source 25 or the fluorescence excitation light source 26), a change in a filter on the observation optical path, an exposure control or an image capturing sensitivity control of the observation camera 24a, or a brightness adjustment of the observation monitor 11a.

In step S6, the user changes the variable magnification optical system 18 to a high magnification side after adjusting the position of the observation field.

In step S7, the brightness correcting portion 34 corrects variation in the brightness of the observation image in a high magnification state on the basis of the position of the observation field transmitted from the adjustment amount determiner 31.

In step S8, in this state, a desired observation field of the sample 14 is shown on the observation monitor 11a with a high magnification. The movement of the observation field and correction of the brightness may be repeated in a high magnification state, if necessary.

As described above, the first embodiment makes it possible to move the observation field two-dimensionally without inclining the observation image by combining the rotational adjustment of the mirror 16 in the tilt direction and the shift adjustment of the second objective lens 17 in the direction of the rotation axis.

In the movement of the observation field, the sample 14 and the first objective lens 15 are not necessary to be moved. Accordingly, even if a electrode needle of a micromanipulator is there in the vicinity of the first objective lens 15, there is no danger of contact with each other.

Moreover, the observation field can be moved accurately in accordance with an input instruction from the computer 11. As a result, convenience for the user is greatly increased such that the same observation field is reproduced over and over by suitably registering the observation field.

Furthermore, in the first embodiment, since the variable magnification optical system 18 is disposed on the optical path to the rear side of the second objective lens 17, the magnification of the observation image can independently be changed with keeping the moved position of the observation field by means of changing magnification of the variable magnification optical system 18.

Second Embodiment

Figure 5:
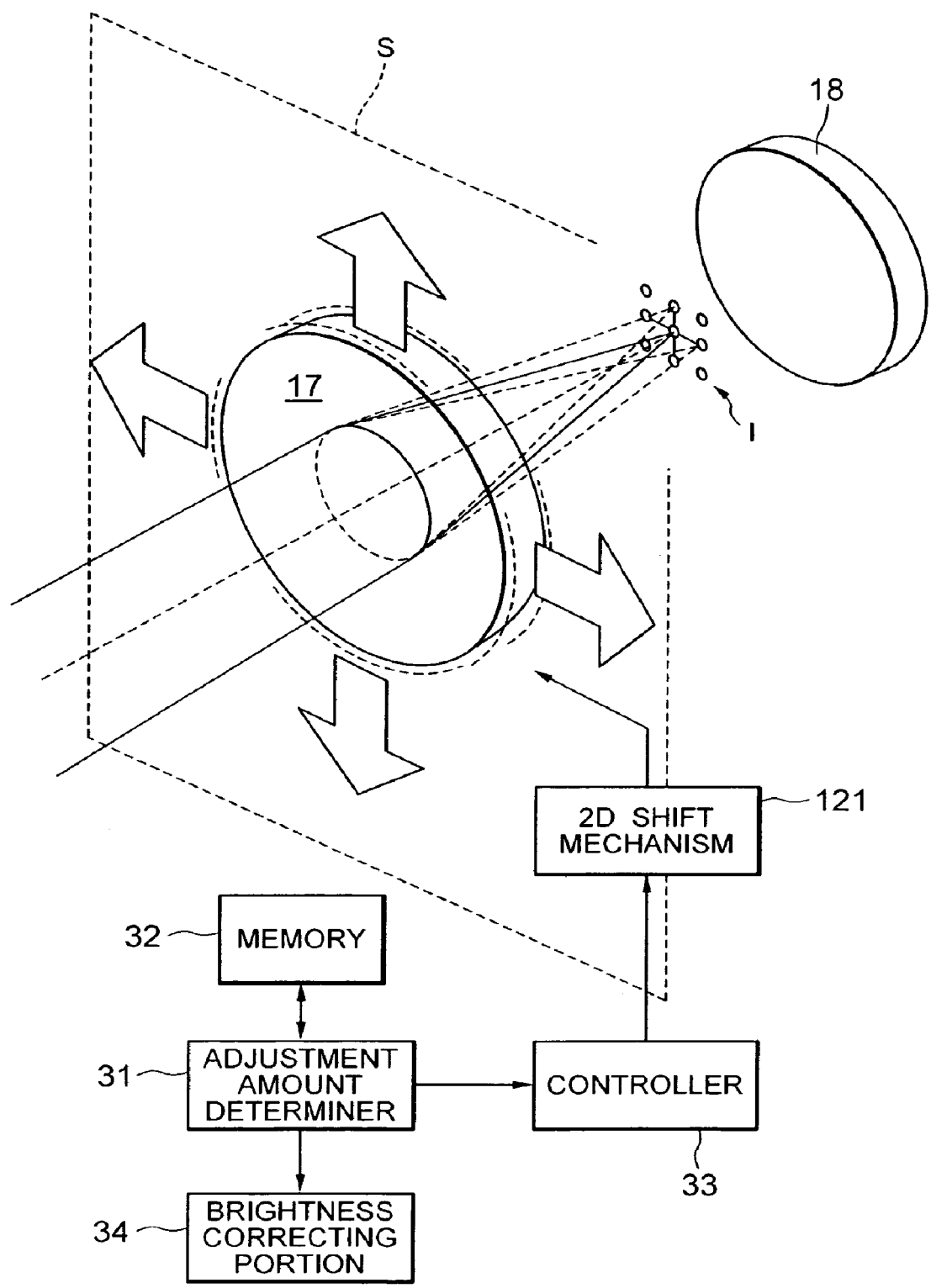
FIG. 5 is a graph explaining a configuration of a microscope according to a second embodiment.

FIG. 5 is a graph explaining a configuration of a microscope according to a second embodiment. Other configurations and the basic operations are the same as the fist embodiment, so duplicated explanations are omitted.

A characteristic of the configuration according to the second embodiment is that instead of the angular adjustment mechanism 20 and the shift mechanism 21, there is provided a two-dimensional shift mechanism 121. By using the two-dimensional shift mechanism 121, the second objective lens 17 can be moved two-dimensionally in a plane S perpendicular to the optical axis.

Such a two-dimensional shift mechanism 121 can be realized by using such as a stage mechanism and a drive mechanism for an optical vibration reduction lens. By using the two-dimensional shift movement, it becomes possible to realize two-dimensional movement of the observation field without inclining the observation image.

Third Embodiment

Figure 6:
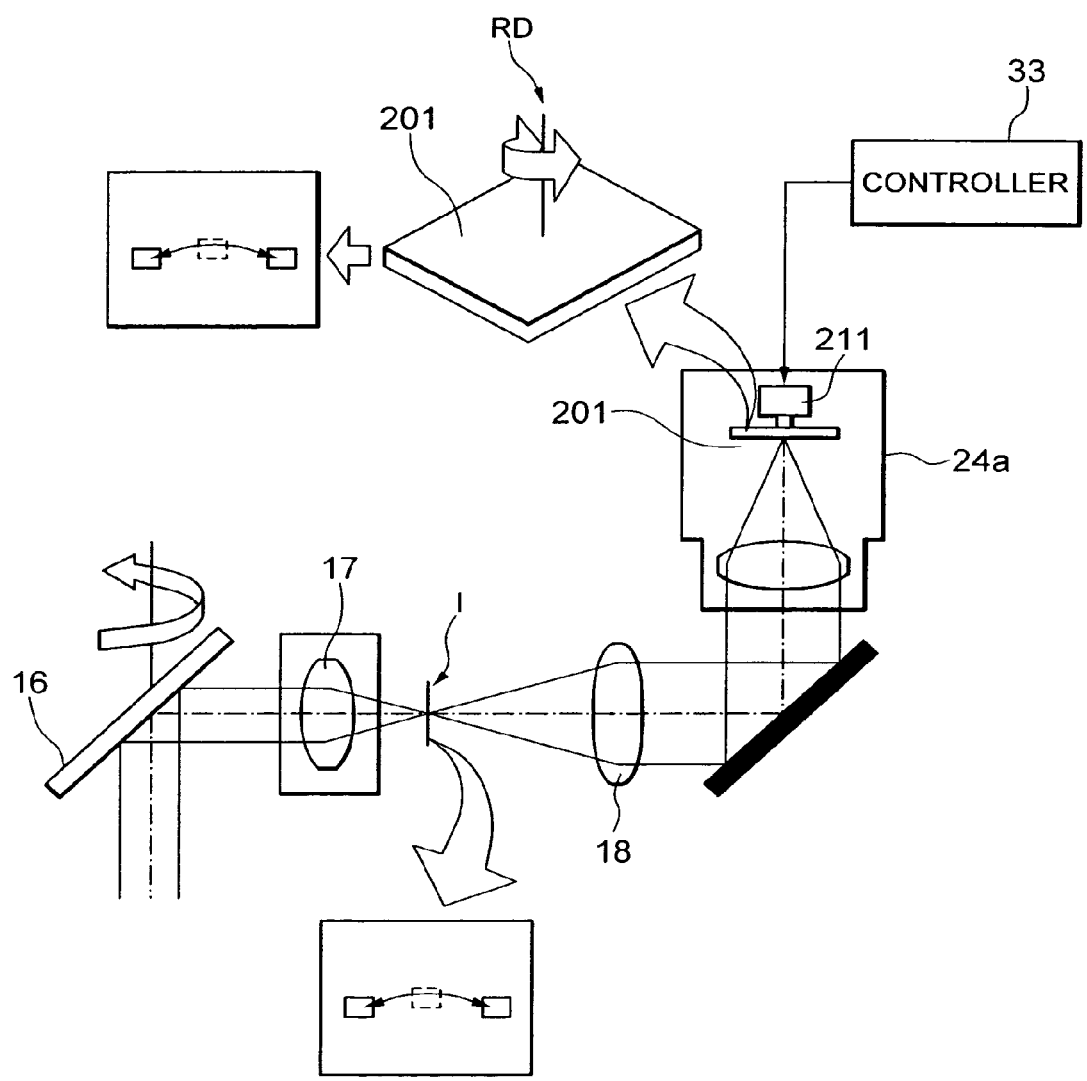
FIG. 6 is a diagram explaining a configuration of a microscope according to a third embodiment.

FIG. 6 is a diagram explaining a configuration of a microscope according to a third embodiment. Other configurations and the basic operations are the same as the fist embodiment, so duplicated explanations are omitted.

In the third embodiment, the angular adjustment mechanism 20 adjusts the direction of the mirror 16 such that the extending direction of the mirror 16 varies. By adjusting the extending direction, two kinds of movement of the mirror 16 shown in FIGS. 3A, 3B and 3C can be realized at the same time.

However, in the movement shown in FIGS. 3B and 3C, the section of the reflected light flux of the mirror 16 is rotated, so that the direction of the observation image is inclined.

Accordingly, in the third embodiment, an imaging device rotation mechanism 211 is newly provided in the observation camera 24a. The imaging device rotation mechanism 211 rotates the imaging device 201 in the observation camera 24a around the rotation axis RD to be equal to the inclination angle of the section of the light flux described above. By the rotation of the imaging device 201, the inclination of the observation image shown on the observation monitor 11a can be cancelled.

The position of the rotation axis RD can be suitably disposed such as the center, periphery, or outside of the imaging device. In particular, by designing the position of the rotation axis RD, the observation field can be moved actively by the rotation of the imaging device, or excessive movement of the observation field can be cancelled out.

By the movement described above, the third embodiment makes it possible to realize the two-dimensional movement of the observation field with canceling the inclination of the observation image.

Fourth Embodiment

Figure 7:
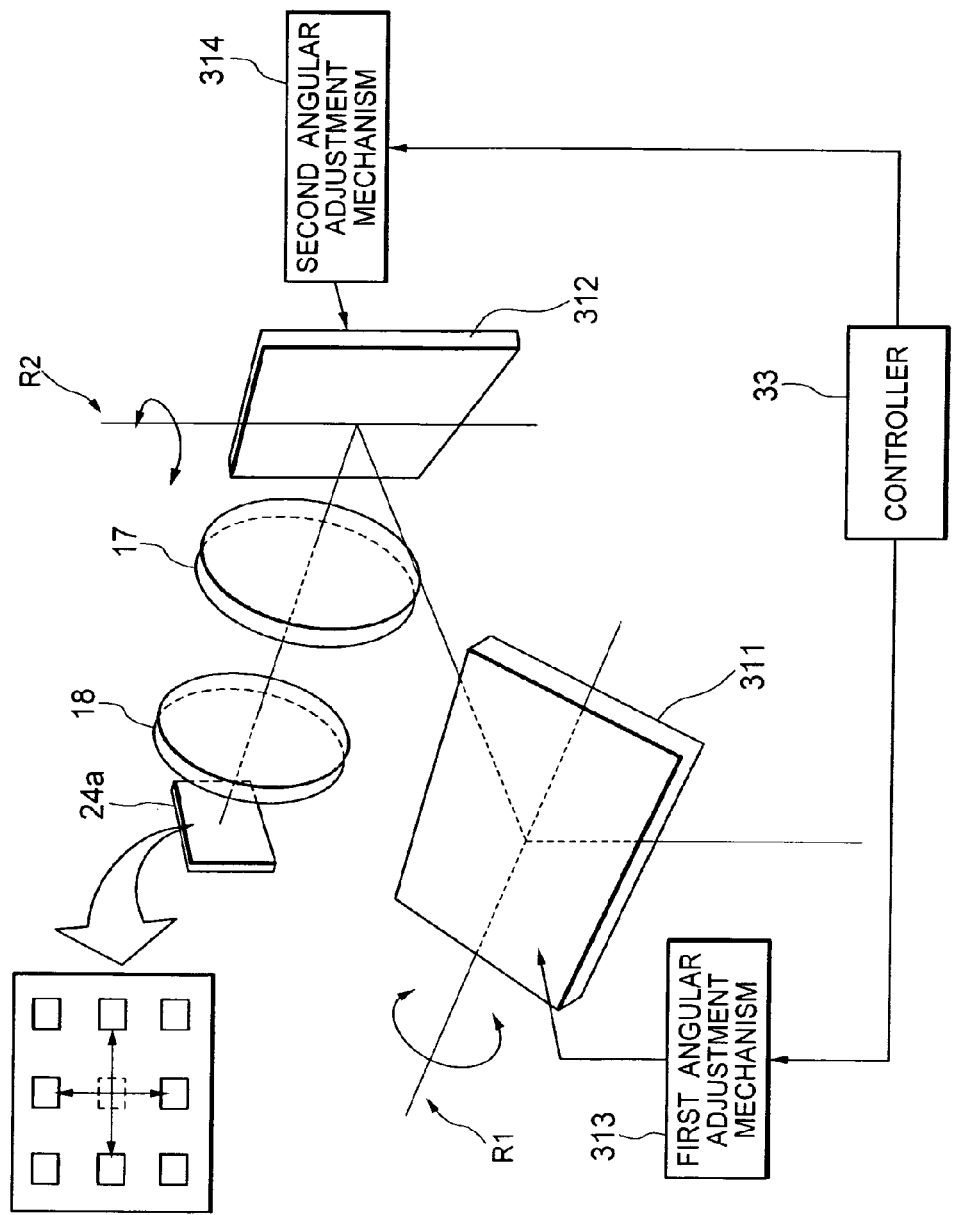
FIG. 7 is a diagram explaining a configuration of a microscope according to a fourth embodiment.

FIG. 7 is a diagram explaining a configuration of a microscope according to a fourth embodiment. Other configurations and the basic operations are the same as the fist embodiment, so duplicated explanations are omitted.

In the fourth embodiment, a first mirror 311 and a second mirror 312 are respectively provided on the optical path between the first objective lens 15 and the second objective lens 17. The two mirrors have respective tilt directions different with each other.

A rotation axis R1 capable of rotating in the tilt direction is provided on the first mirror 311. A first angular adjustment mechanism 313 rotatably adjusts the first mirror 311 around the rotation axis R1.

Similarly, a rotation axis R2 capable of rotating in the tilt direction is provided on the second mirror 312. A second angular adjustment mechanism 314 rotatably adjusts the second mirror 312 around the rotation axis R2.

As shown in FIG. 3A, by rotatably adjusting a mirror in a tilt direction, the observation field can be moved linearly in one direction without inclining the observation image.

In the fourth embodiment, by rotatably adjust two mirrors 311 and 312 having different tilt directions with each other, the observation field can be linearly moved in two directions different with each other, which is a two-dimensional movement, without inclining the observation image.

Fifth Embodiment

Then, an embodiment that the microscope system according to any of the first through fourth embodiment is used as a virtual slide forming system is explained.

By moving internal mechanism of the microscope 12, the computer 11 scans the observation field stepwise without moving the sample 14 or the first objective lens 15. With synchronizing the scan, the computer 11 successively inputs image data output from the observation camera 24a. By storing the image data into an internal memory in accordance with the position of the observation field at the time of capturing, synthesized image data covering entire area of the sample 14 can be formed. The synthesized image data is stored in a recording device in the computer 11. By suitably reading out and displaying the synthesized image data by the computer 11, the image data can be used as virtual slides of the sample 14.

In a conventional virtual slide forming system, the sample 14 has to be scanned little by little, so that there has been a drawback that the sample 14 is affected by the vibration.

On the other hand, in the microscope system according to any of the first though fourth embodiments, the scanning movement of the observation field can be realized in the microscope optical system without moving the sample 14. Accordingly, it becomes possible to form virtual slides in a superb sample state without being affected by the vibration.

Figure 8:
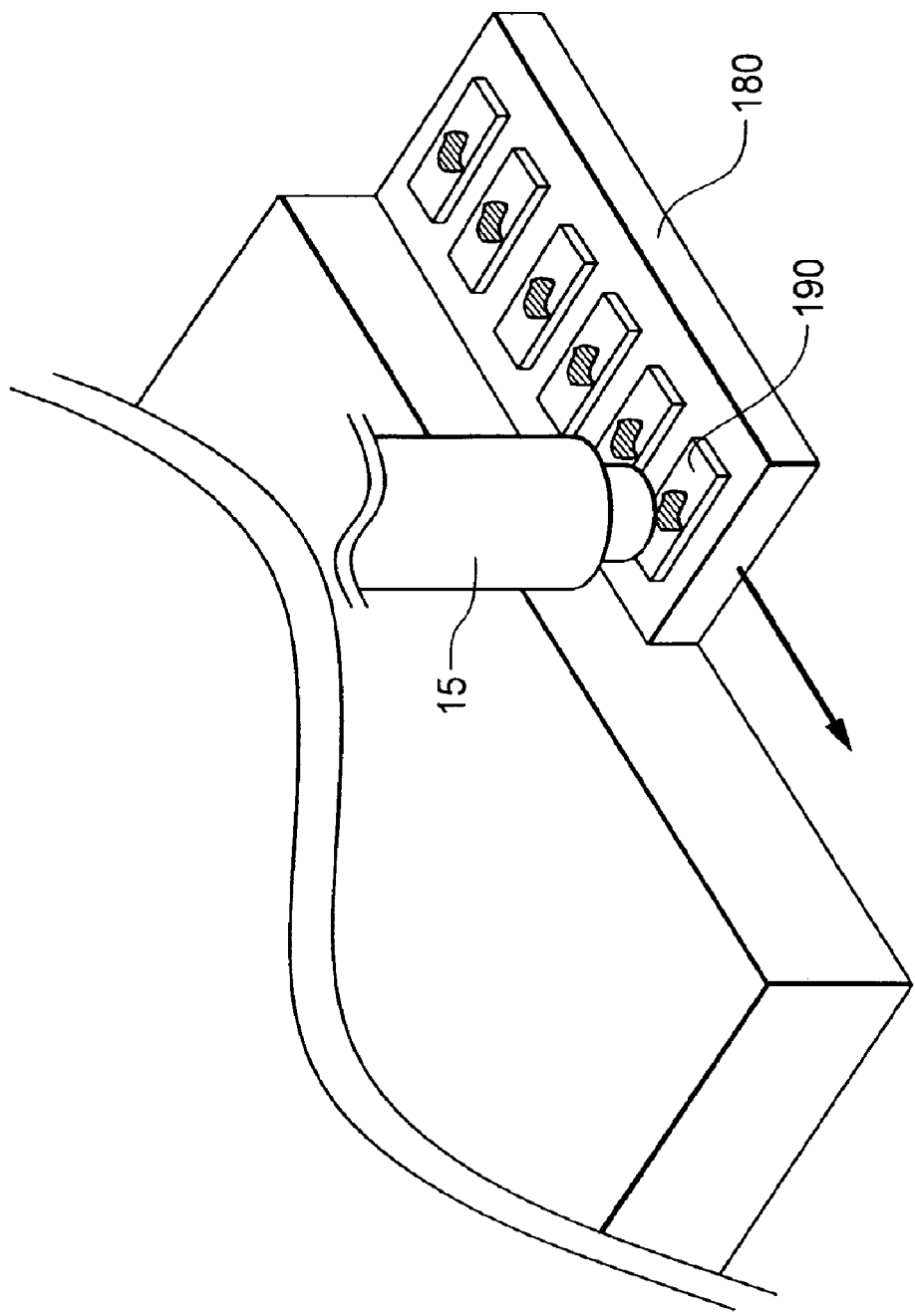
FIG. 8 is a perspective view showing a large stage 180 suitable for a virtual slide forming system.

FIG. 8 is a perspective view showing a large stage 180 suitable for the virtual slide forming system. The large stage 180 can be installed in the microscope 12 instead of the stage 13 shown in FIG. 1.

When the large stage 180 controlled by the computer 11 is moved, a plurality of slide samples 190 placed on the large stage can be changed successively. In this case, except the time for changing the sample, the vibration hardly affects the microscope, so that a lot of virtual slides in a superb sample state can be formed at a time.

In the above-described embodiments, an upright microscope is mentioned for explaining each embodiment. However, the embodiment is not limited to this. The present invention can be applied to an inverted microscope.

In the above-described embodiments, an example in which a rotation axis is fixed to the center of the mirror is explained. However, the embodiment is not limited to this. For example, the rotation axis may be removed from the center of the mirror.

In the above-described embodiments, the second objective lens is disposed on the optical axis after the mirror. However, the embodiment is not limited to this. For example, the second objective lens may be disposed before the mirror.

As described above, the present invention is applicable to a technological field of a microscope such as a microscope for electrophysiology or virtual slide forming.

Additional advantages and modifications will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A microscope comprising:
a first objective lens disposed on an optical path between a sample and an observation image, and disposed near to the sample;
a second objective lens that forms an intermediate image conjugate with the sample together with the first objective lens;
a mirror that is disposed with a tilt on the optical path between the first objective lens and the second objective lens and changes a direction of the optical path by reflection;
a two-dimensional shift mechanism that moves the second objective lens two-dimensionally in a plane perpendicular to the optical path;
an adjustment amount determiner that determines a two-dimensional shift amount of said second objective lens on the basis of an observation field input instruction; and
a controller that controls drive of said two-dimensional shift mechanism in accordance with the shift amount determined by said adjustment amount determiner;
wherein the observation field of the sample can be moved two-dimensionally by the two-dimensional shift mechanism.

2. A virtual slide forming system comprising:
the microscope according to claim 1;
an image data forming portion that successively produces image data by capturing the observation image with varying the observation field of the microscope; and
an image synthesizing portion that forms a virtual slide of the sample by synthesizing a plurality of the produced image data.

3. The microscope according to claim 1, further comprising:
a memory that stores corresponding relation between a position of the observation field and the shift amount of the second objective lens.

4. The microscope according to claim 3, wherein:
the adjustment amount determiner determines an adjustment amount of the shift of the second objective lens by referring to the corresponding relation in the memory for the position of the observation field.

5. The microscope according to claim 1, further comprising:
a brightness correcting portion that corrects a brightness of the observation image, and holds a brightness of an observation image display device constant.

6. The microscope according to claim 1, wherein a brightness correction of the observation image is carried out by controlling a brightness of an illumination light source, changing a filter on the optical path, controlling an exposure or an image capturing sensitivity of an imaging device for capturing the observation image, or adjusting a brightness of an observation image display device.

* * * * *